US012673329B2

(12) United States Patent
Löhr et al.

(10) Patent No.: US 12,673,329 B2
(45) Date of Patent: Jul. 7, 2026

(54) CRUSHER UNIT AND METHOD FOR ADJUSTING THE CRUSHING GAP OF A CRUSHER UNIT

(71) Applicant: Kleemann GmbH, Göppingen (DE)

(72) Inventors: Felix Löhr, Welzheim (DE); Christian Schlecht, Aalen (DE); Christian Weller, Esslingen (DE)

(73) Assignee: Kleeman GmbH, Göppingen (DE)

( * ) Notice: Subject to any disclaimer, the term of this patent is extended or adjusted under 35 U.S.C. 154(b) by 252 days.

(21) Appl. No.: 18/486,420

(22) Filed: Oct. 13, 2023

(65) Prior Publication Data

US 2024/0139751 A1 May 2, 2024

(30) Foreign Application Priority Data

Oct. 28, 2022 (DE) ..................... 10 2022 128 778.5

(51) Int. Cl.
*B02C 13/09* (2006.01)
*B02C 13/286* (2006.01)

(52) U.S. Cl.
CPC .......... *B02C 13/095* (2013.01); *B02C 13/286* (2013.01); *B02C 2013/28609* (2013.01); *B02C 2013/28636* (2013.01)

(58) Field of Classification Search
CPC .............................. B02C 13/09; B02C 13/095
See application file for complete search history.

(56) References Cited

U.S. PATENT DOCUMENTS 8,033,489 B2 10/2011 Boast
8,668,158 B2 * 3/2014 Dallimore .............. B02C 25/00 241/189.1

(Continued)

FOREIGN PATENT DOCUMENTS

CN 102834178 A 12/2012
CN 206587833 U 10/2017

(Continued)

OTHER PUBLICATIONS

German office action from corresonding German application No. 10 2022 128 778.5, dated Jul. 28, 2023, 12 pages (not prior art).

(Continued)

*Primary Examiner* — Matthew Katcoff
(74) *Attorney, Agent, or Firm* — Lucian Wayne Beavers; Patterson Intellectual Property Law, PC

(57) ABSTRACT

The invention relates to a crusher unit (10), in particular an impact crusher, having an impact rotor (11), having at least one swivel-mounted impact rocker (20), wherein a crushing gap (15) is formed between the impact rotor (11) and the impact rocker (20), wherein the impact rocker (20) can be swiveled along an adjustment path by means of at least one gap-adjusting means (30) to set a gap width of the crushing gap (15), wherein the impact rocker (20) is mounted such that its weight force acts in the direction of a reduction of the crushing gap (15). For a high degree of operational safety, the crushing gap can be readjusted during operation in that at least one retaining device (50) is provided, which uses a retaining force to flexibly counteract a swiveling of the impact rocker (20) in the direction of the impact rotor (11). The invention also relates to a method for setting the crushing gap (15) of a crusher unit (10).

18 Claims, 3 Drawing Sheets

(56) References Cited

U.S. PATENT DOCUMENTS

| | | | |
|---|---|---|---|
| 8,967,504 B2 | 3/2015 | Dallimore et al. | |
| 10,279,354 B2 | 5/2019 | Young et al. | |
| 10,960,400 B2 | 3/2021 | Schnabel et al. | |
| 11,779,932 B2 | 10/2023 | Meyer et al. | |
| 2025/0312798 A1* | 10/2025 | Mcdevitt | B02C 25/00 |

FOREIGN PATENT DOCUMENTS

| | | | |
|---|---|---|---|
| CN | 212092526 | U | 12/2020 |
| CN | 113751130 | A | 12/2021 |
| DE | 966555 | C | 8/1957 |
| DE | 2331729 | A1 | 1/1975 |
| DE | 3911086 | A1 | 4/1990 |
| DE | 102020114106 | A1 | 12/2021 |

OTHER PUBLICATIONS

German Office Action in the corresponding patent application No. 23 201 158.5, dated Jan. 2, 2026, 7 pages (not prior art).
Chinese Office Action in the corresponding patent application No. 2026051502168700, dated May 15, 2026, 7 pages (not prior art).

* cited by examiner

CRUSHER UNIT AND METHOD FOR ADJUSTING THE CRUSHING GAP OF A CRUSHER UNIT

RELATED APPLICATION

The present application claims priority to German Patent Application Ser. No. DE 10 2022 128 778.4, filed on Oct. 28, 2022, which is incorporated herein by reference.

BACKGROUND OF THE DISCLOSURE

The invention relates to a crusher unit, in particular an impact crusher, having an impact rotor and having at least one swivel-mounted impact rocker, wherein a crushing gap is formed between the impact rotor and the impact rocker, wherein the impact rocker can be swiveled along an adjustment path by means of at least one gap-adjusting means to set a gap width of the crushing gap, and wherein the impact rocker is mounted such that its weight force acts in the direction of a reduction of the crushing gap.

The invention further relates to a process for adjusting the crushing gap of such a crusher unit.

DESCRIPTION OF THE PRIOR ART

From U.S. Pat. No. 8,033,489 B2 an impact crusher having a rotor provided inside a housing is known. The rotor is mounted to rotate about an axis and has several impact bars distributed along its circumference, which impact bars define an impact circle of the impact crusher. Furthermore, an impact rocker is suspended inside the housing such that it can swivel about an axis. A crushing gap is formed between an end of the impact rocker facing away from the suspension and the impact circle. Furthermore, a device is provided to limit the swiveling motion of the impact rocker inside the impact circle. This device has a shaft, the end of which is connected to the impact rocker by means of a swivel connection. The shaft is guided through an opening in the housing in the area of a stop. Outside the housing, the shaft is housed in a sleeve. The shaft and sleeve can be adjusted relative to each other by means of a threaded connection, such that a free length of the shaft between the sleeve and the swivel connection with the impact rocker can be set. Resting the sleeve on a stop limits a swivel path of the impact rocker inside the impact circle. Furthermore, a pretensioning device is provided, which exerts a force on the impact rocker in the direction of the impact circle and thus on the stop. The pretensioning device comprises a hydraulic cylinder, in which a piston rod is guided. Facing away from the cylinder, the piston rod is swivel connected to the impact rocker. To set the gap width of the crushing gap, first the pretensioning device is relieved. The relative position of the stop is set by adjusting the shaft and the sleeve relative to each other.

A disadvantage of known impact crushers is that the crushing gap can only be altered by adjusting a fixed stop. For this purpose, for instance, a hydraulic cylinder first has to be relieved. Subsequently, the position of the stop has to be altered, for instance by means of a thread. This means that the crushing gap cannot be adjusted during crushing. Instead, the crushing operation must be interrupted, which causes down times in operation and thus costs. Furthermore, the procedure for setting the crushing gap is complex and time-consuming.

SUMMARY OF THE DISCLOSURE

To ensure a largely constant product quality of the crushed material, it may be desirable to reliably keep the gap width of the crushing gap as constant as possible during crushing. However, changing operating conditions and requirements for the crushed material may also require readjustment of the gap width. For instance, it may be necessary to readjust the gap width due to increasing wear of the impact rocker or parts of the impact rocker or the impact rotor or impact bars provided thereon. Changes in the properties of the feed material, such as rock size or hardness, may also necessitate a change in gap width. Furthermore, it is conceivable that modified product properties of the crushed material are desired. For instance, a coarser or finer product may be desired. Accordingly, it may be necessary to increase or decrease the crushing gap.

For reasons of operational safety, it is also necessary to prevent an impact rocker from unintentionally coming into contact with the impact rotor.

The invention addresses the problem of creating a crusher unit having a high level of operational reliability, which enables simplified readjustment of the crushing gap, preferably during operation.

The invention also addresses the problem of providing a method for adjusting the crushing gap of a crusher unit, which allows a simplified readjustment of the crushing gap, preferably during operation.

The problem relating to the crusher unit is solved in that at least one retaining device is provided, which uses a retaining force to flexibly oppose a swiveling of the impact rocker in the direction of the impact rotor.

The retaining force of the retaining device can thus prevent the impact rocker from unintentionally coming into contact with the impact rotor, in particular with any impact bars provided on the impact rotor, for instance as a result of its gravity. To this end, the retaining device forms a stop.

The retaining force of the retaining device can, for instance, act between the impact rocker and a mechanically stable element of the crusher unit. For instance, it is conceivable that the retaining device is connected directly or indirectly in a suitable manner to a crusher housing of the crusher unit or to a chassis of an upstream material processing device. Preferably, the impact rocker can be swivel mounted directly or indirectly on the same element or structural unit.

Because the retaining force of the retaining device acts flexibly, the impact rocker is prevented from hitting the stop hard if, for instance, the impact rocker suddenly falls from an initially held swivel position in the direction of the impact rotor. Such a situation is conceivable in the event of failure of other components of the crusher unit, in particular the gap-adjusting means. Such a situation is also conceivable if, due to an overload event, for instance in the case of a non-crushable material in the crushing chamber, the impact rocker swerves from its original swivel position and, after swerving, moves back towards the impact rotor.

A flexible retaining force of the retaining device further has the advantage that it can be designed to be at least partially overcome by the gap-adjusting means. In contrast to a fixed stop, in this way a desired gap width can be set, in particular at least partially against the retaining force, without any manual adjustment of a fixed stop. Thus, according to the invention, provision is made for the gap-adjusting means to reduce the gap width of the crushing gap to counteract the retaining force of the retaining device at least along parts of the adjustment path.

Accordingly, the crushing gap can be adjusted during ongoing operation, while still ensuring a high level of operational safety by reliably preventing any unintentional contact between the impact rocker and the impact rotor by means of the retaining device.

A crusher unit according to the invention may, for instance, be part of a material processing device, in particular a mobile material processing device. In addition to the crusher unit, such a material processing device may comprise further components, such as a feed unit, a material feed device, one or more screening units, one or more conveying devices such as belt conveyors and/or a chassis.

According to an advantageous further development of the invention, it is proposed that the retaining device comprises a flexible clamping element. The flexible clamping element can, for instance, provide a flexible retaining force of the retaining device.

Preferably, the clamping element can be of spring-elastic design. In particular, it is possible that the clamping element is designed as a spring. Possible designs of the clamping element can thus include, for instance, various types of compression or tension springs, in particular helical, barrel, conical, torsion, leaf or disc springs. It is also conceivable that the clamping element acquires its flexibility owing to a selected stress cross-section or a selected flexible material.

An advantageous variant of the invention can be such that the retaining device has a tension element, which is connected on the one hand to the impact rocker and on the other hand to the clamping element, and that the tension element transfers a force between the clamping element and the impact rocker.

In this way, it is easy to achieve force transfer between the clamping element and the impact rocker. For instance, a tension element may comprise a rod or a flexible element, in particular a rope. Advantageously, the tension element transfers at least predominantly a tensile force and preferably no or only limited compression forces, which in particular reduces the risk of buckling.

According to the invention, provision may be made for the clamping element to have an end area at the rocker end and a second end area. The end area at the rocker end of the clamping element can, for instance, be directly or indirectly connected to the crusher housing, in particular be fastened thereto and/or rest thereon. The end area of the rocker end of the clamping element may be spaced apart from and/or preferably provided opposite from the second end area at the clamping element.

Furthermore, provision may be made for the tension element to have a coupling area at the rocker end and a coupling area at the clamping element end. For instance, the two coupling areas may be spaced apart and/or preferably provided at opposite end areas of the tension element.

Preferably, the coupling area at the rocker end of the tension element can be connected to the impact rocker. In particular, it may be preferred to design this connection to be swiveling. Such a swivel connection can be achieved, for instance, by providing a retaining section on the impact rocker, in which a fastener can be mounted, wherein the fastener can be a pin or a bolt, for instance. The coupling area at the rocker end may in turn comprise a bearing mount for mounting the fastener. By means of the retaining section and the fastener, a swivel bearing can thus be provided for connecting the coupling area at the rocker end to the impact rocker.

If provision is also made for the coupling area at the clamping element end of the tension element to be secured to the clamping element, a connection between the clamping element and the impact rocker is created in a structurally simple manner. The coupling area at the clamping element end can be detachably or non-detachably secured to the clamping element, in particular it can be connected in a form-fitting or force-fitting manner or by material bonding. It is conceivable, for instance, that a screwed, welded, glued or clamped connection is provided.

A preferred embodiment of the invention can be characterized in that the clamping element is designed as a compression spring, in that the end area at the rocker end of the clamping element rests indirectly or directly on a crusher housing of the crusher unit, and in that the coupling area at the clamping element end of the tension element is secured to the second end area of the clamping element.

Thus, it is possible that the tension element and/or the clamping element is/are at least partially disposed in easily accessible areas of the crusher unit, in particular at least partially outside the crusher housing. This can facilitate assembly and/or maintenance work on the retaining device and/or other components of the crusher unit. Particularly preferably, at least the coupling area at the clamping element end and/or the second end area is/are disposed in easily accessible areas of the crusher unit, in particular at least partially outside the crusher housing.

Alternatively or additionally, provision may be made for the clamping element to be designed as a tension spring, for the second end area of the clamping element to be directly or indirectly connected to a crusher housing of the crusher unit, and for the coupling area at the clamping element end of the tension element to be secured to the end area at the rocker end of the clamping element.

It is conceivable, for instance, that one retaining device of the crusher unit has a clamping element designed as a compression spring and a further retaining device has a clamping element designed as a tension spring. In particular, design specifications such as available installation space can be taken into account in this way. It is therefore conceivable that, depending on the installation location, retaining devices having tension or compression springs are easier to install.

A variant of the invention may be characterized in that the tension element comprises a floppy element, in particular a rope, more preferably a wire rope, or a chain. A floppy element has the advantage of requiring less space when the distance between the clamping element and the impact rocker is shortened, in particular if the latter is moved away from the impact rotor. In such a setup, a flexurally rigid element, such as a rod, could protrude at least partially from the crusher housing in an unfavorable manner. In particular, if the impact rocker is deflected abruptly due to an overload event, a flexurally stiff tension element that abruptly pushes out of the crusher housing could pose a significant safety risk.

According to a preferred embodiment of the invention, it is proposed that a minimum permissible gap width of the crushing gap is provided, that a clamping force of the clamping element is in equilibrium with or greater than the effect of the weight force of the impact rocker when the aperture gap width is at minimum.

A minimum permissible gap width of the crushing gap can in particular represent a desired safety distance between the impact rocker and the impact rotor, in particular between the impact rocker and the impact circle. Because the impact rocker is mounted in such a way that its weight force acts in the direction of a reduction of the crushing gap, it is advantageous if the clamping force of the clamping element is sufficient to prevent further swiveling beyond the minimum gap width.

Particularly advantageously, however, the clamping force of the clamping element still has an excess force in the direction of increasing the gap width at a minimum distance between the impact rocker and the impact rotor. Accordingly, the equilibrium position, in which the clamping force of the clamping element is in equilibrium with the effect of the weight force of the impact rocker, can exist at a larger than the minimum permissible gap width. Preferably, the excess force is low so that the force required by the gap-adjusting means to adjust the gap width of the crushing gap is not excessively increased. Thus, the gap-adjusting means can be efficiently dimensioned.

A stable design of the crusher unit can be obtained if provision is made for a fastening section to be provided on the/one crusher housing, and at least one gap-adjusting means and at least one retaining device are retained on the fastening section.

The fastening section can be reinforced to transfer greater forces. In particular, the fastening section may have higher mechanical stability compared to other elements of the crusher housing. The fastening section may also be designed to provide suitable attachment points for fasteners to attach gap-adjusting means(s) and/or retaining device(s).

To this end, provision may be made in particular for the fastening section to have a plate-shaped upper support element and, spaced apart therefrom, a plate-shaped lower support element, wherein the two support elements are connected by means of at least two connecting elements. Thus, a particularly rigid fastening section is provided. Furthermore, the two support elements each provide suitable connection levels for the gap-adjusting means and/or the retaining device(s). A simple and stable design can result in particular if the fastening section forms a rectangular hollow section.

According to an advantageous embodiment of the invention, it is proposed that the gap-adjusting means is disposed in a central area, preferably centrally, with respect to a longitudinal extent of the impact rocker oriented in the direction of an axis of rotation of the impact rotor. This optimally permits force to be transferred from the gap-adjusting means to the impact rocker. In particular, the occurrence of undesirable bending moments on the impact rocker is prevented or at least reduced.

Further, provision may preferably be made for at least one retaining device each to be disposed on both sides of the gap-adjusting means. This creates a redundancy that reliably prevents unintentional contact between the impact rocker and the impact rotor. It is also conceivable that the retaining devices can be dimensioned smaller if several sensibly arranged retaining devices are provided. In particular, assembly advantages can result if the clamping elements comprise, for instance, spring-elastic elements, in particular springs, which can be dimensioned accordingly using a lower clamping force. Particularly preferably, the retaining devices can be disposed symmetrically to the gap-adjusting means.

A preferred embodiment of the invention may be characterized in that the end area of the clamping element at the rocker end rests on the lower support element, in that the lower support element has a first aperture, wherein the tension element is guided through the first aperture, preferably in that the upper support element has a second aperture, through which the clamping element and/or the clamping element is/are guided.

A crusher unit according to the invention can be such that the gap-adjusting means has an actuator, preferably in the form of a hydraulic cylinder, and that the gap-adjusting means has a transfer element, preferably in the form of a piston rod, which can be adjusted relative to the actuator. Particularly preferably, the actuator is provided in the form of a double-acting hydraulic cylinder. Thus, the gap-adjusting means can keep the impact rocker at a desired distance from the impact rotor during normal operation and/or maintain a desired crushing gap. In addition to hydraulic gap-adjusting means, however, it is also conceivable that mechanical, electromechanical or electrical gap-adjusting means are used.

To protect the crusher unit from damage in the event of an overload, provision may be made in accordance with the invention for an overload device interacting with the gap-adjusting means to be provided, which causes or at least enables a widening of the crushing gap in the event of an overload situation, wherein the overload device is preferably designed to be hydraulic, in particular as a pressure relief valve or burst plate, or mechanically, for instance as a pressure plate.

In particular, if a hydraulic gap-adjusting means is used, a hydraulic overload device, for instance an overpressure protection, in particular a relief valve can be provided in a hydraulic circuit, preferably in a joint hydraulic circuit with the gap-adjusting means. In the event of an overload, for instance due to non-crushable material in the crushing chamber, a large force is exerted on the impact rocker, which is ultimately transferred to the gap-adjusting means. This can cause the pressure inside the actuator, in particular the hydraulic cylinder, to rise above an intended maximum pressure. An overload device, which permits this high pressure to be released, now permits the impact rocker to deflect such that the non-crushable material can exit the crushing chamber.

However, a combination of a hydraulic gap-adjusting means and a mechanical overload device or vice versa is also conceivable. In principle, the gap-adjusting means and the overload device do not have to be based on the same operating principle, e.g., hydraulic, electrical and/or mechanical.

The mechanical overload device can be, for instance, a pressure plate disposed in the force flow between the impact rocker and the gap-adjusting means. Preferably, the pressure plate can have a predetermined breaking point. If the impact rocker now exerts an excessive force on the gap-adjusting means in the event of an overload, the pressure plate can break, preferably at the predetermined breaking point, to permit the impact rocker to move out of the way.

According to a preferred embodiment of the invention, provision may be made for the impact rocker to be swivel mounted on the/one housing of the crusher unit by means of a rocker bearing, for the/a tension element of the retaining device to be swivel connected to the impact rocker at a retaining section thereof, for the/one transfer element of the gap-adjusting means to be swivel connected to the impact rocker at a coupling section thereof, and for the retaining section and the coupling section to be disposed at the half, preferably at the first third, of the longitudinal extent of the impact rocker opposite from the rocker bearing. In this way, the gap-adjusting means and/or the retaining device have to apply lower forces than if they were connected to the impact rocker closer to the rocker bearing. Accordingly, retaining device and/or gap-adjusting means can be connected to the impact rocker in a position that provides a favorable lever arm for force transfer to the impact rocker with respect to the position of the rocker bearing.

BRIEF DESCRIPTION OF THE DRAWINGS

The invention is explained in greater detail below based on an exemplary embodiment shown in the drawings. In the figures.

DETAILED DESCRIPTION

Figure 1:
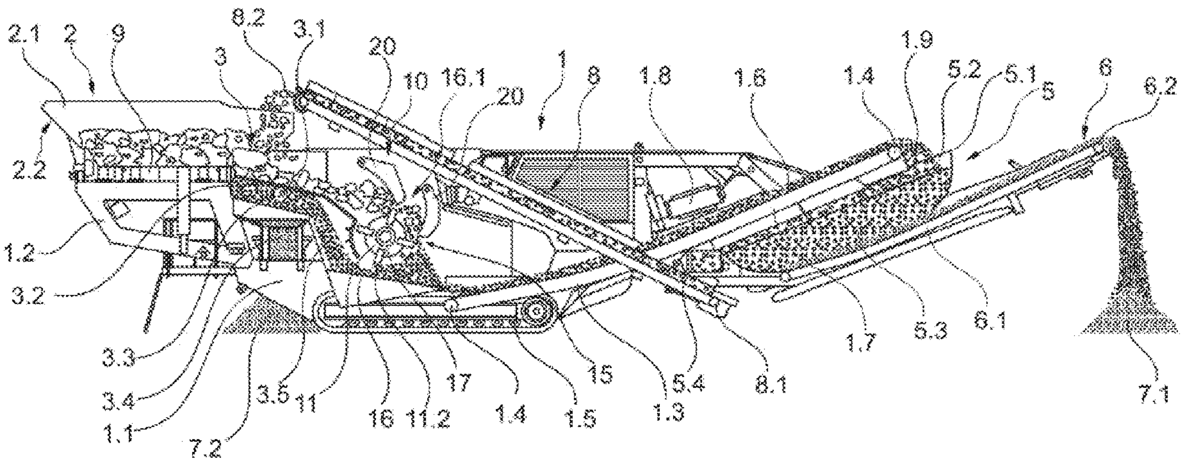
FIG. 1 shows a side view of a schematic representation of a material processing device 1 having a crusher unit 10.

FIG. 1 shows a material processing device 1 in the form of a crusher. The material processing device is designed as a mobile material processing device and therefore has undercarriages 1.5. However, it is also conceivable that the material processing device 1 is a stationary material processing device 1.

The material processing device 1 has a chassis 1.1 that bears the machine components or at least a part of the machine components. At its rear end, the chassis 1.1 has a cantilever 1.2. A material feed area is formed in the area of the cantilever 1.2.

The material feed area comprises a feed hopper 2 and a material feed device 9.

The feed hopper 2 may be formed at least in part by hopper walls 2.1 extending in the direction of the longitudinal extent of the material processing device 1 and a rear wall 2.2 extending transversely to the longitudinal extent. The feed hopper 2 leads to a material feed device 9.

As shown in this exemplary embodiment, the material feed device 9 comprise have a conveyor chute that can be driven by means of a vibratory drive. The feed hopper 2 can be used to feed material to be comminuted into the material processing device 1, for instance using a wheel loader, and to feed it onto the conveyor chute.

From the conveyor chute, the material to be comminuted passes into the area of a screen unit 3. This screen unit 3 may also be referred to as a pre-screening arrangement. At least one screen deck 3.1, 3.2 is disposed in the area of the screen unit 3. In this exemplary embodiment two screen decks 3.1, 3.2 are used.

A partial fraction of the material to be comminuted is screened out at the upper screen deck 3.1. This partial fraction already has a sufficient particle size that it no longer needs to be comminuted in the material processing device 1. In this respect, this screened out partial fraction can be routed past a crusher unit 10 through a bypass channel 3.5.

If a second screen deck 3.2 is used in the screen unit 3, a further fine particle fraction can be screened out from the partial fraction that accumulates below the screen deck 3.1. This fine particle fraction can be routed to a lateral discharge conveyor 3.4 below the screen deck 3.2. The fine particle fraction is diverted from the lateral discharge conveyor 3.4 and conveyed to a rock pile 7.2 located laterally of the machine.

As FIG. 1 illustrates, the screen unit 3 may be a vibrating screen having a screen drive 3.3. The screen drive 3.3 causes the screen deck 3.1 and/or the screen deck 3.2 to vibrate. Owing to the inclined arrangement of the screen decks 3.1, 3.2 and in conjunction with the vibration motions, material on the screen decks 3.1, 3.2 is transported towards the crusher unit 10 or towards the bypass channel 3.5.

The material to be comminuted routed from the screen deck 3.1 is routed to the crusher unit 10, as shown in FIG. 1.

The crusher unit 10 may be designed to be a rotary impact crusher unit. The crusher unit 10 then has an impact rotor 11 driven by a drive 12. In FIG. 1, the axis of rotation 17 of the impact rotor 11 is horizontal in the direction of the image depth.

For instance, the outer periphery of the impact rotor 11 may be equipped with impact bars 11.2. Opposite from the impact rotor 11, for instance, wall elements may be disposed, preferably in the form of impact rockers 20. When the impact rotor 11 is rotating, the impact bars 11.2 throw the material to be comminuted outwards. In so doing, this material hits the impact rockers 20 and is comminuted due to the high kinetic energy. When the material to be comminuted is of sufficient particle size to allow the material particles to pass through a crushing gap 15 between the impact rockers 20 and the radially outer ends of the impact bars 11.2, the comminuted material exits the crusher unit 10 through the crusher outlet 16.

It is conceivable that in the area of the crusher outlet 16, the comminuted material routed from the crusher unit 10 is combined with the material routed from the bypass channel 3.5 and transferred onto a belt conveyor 1.3. The belt conveyor 1.3 can be used to convey the material out of the working area of the crusher unit 10.

As shown in the drawings, the belt conveyor 1.3 may comprise an endless circulating conveyor belt having a slack side 1.6 and a tight side 1.7. The slack side 1.6 is used to catch and transport away the crushed material falling from the crusher outlet 16 of the crusher unit 10. At the belt ends, deflection rollers 1.4 can be used to deflect the conveyor belt from the slack side 1.6 to the tight side 1.7 and vice versa. Guides, in particular support rollers, can be provided in the area between the deflection rollers 1.4 to change the direction of conveyance of the conveyor belt, to shape the conveyor belt in a certain way and/or to support the conveyor belt.

The belt conveyor 1.3 has a belt drive, which can be used to drive the belt conveyor 1.3. The belt drive can preferably be disposed at the discharge end 1.9 or in the area of the discharge end 1.9 of the belt conveyor 1.3.

The belt conveyor 1.3 can be connected, for instance by means of the belt drive, to a control device by means of a control line.

One or more further belt conveyors 6 and/or a return conveyor 8 may be used, which in principle have the same design as the belt conveyor 1.3. In this respect, reference can be made to the above statements.

A magnet 1.8 can be disposed above the slack side 1.6 in the area between the feed end and the discharge end 1.9. The magnet 1.8 can be used to lift iron parts from the broken material and move them out of the conveying area of the belt conveyor 1.3.

A re-screening device 5 can be disposed downstream of the belt conveyor 1.3. The crusher unit 5 has a screen housing 5.1, in which at least one screen deck 5.2 is mounted. Below the screen deck 5.2, a housing base 5.3 is formed, which is used as a collection space for the material screened out at the screen deck 5.2.

An opening in the lower housing part 5.3 creates a spatial connection to the further belt conveyor 6. Here, the further belt conveyor 6 forms its feed area 6.1, wherein the screened material in the feed area 6.1 is directed onto the slack side of the further belt conveyor 6. The further belt conveyor 6 conveys the screened material towards its discharge end 6.2. From there, the screened material is transferred to a rock pile 7.1.

The material not screened out at the screen deck 5.2 of the re-screening device 5 is conveyed from the screen deck 5.2 onto a branch belt 5.4. The branch belt 5.4 can also be designed as a belt conveyor, i.e., reference can be made to the explanations given above with respect to the belt conveyor 1.3. In FIG. 1, the transport direction of the branch belt 5.4 extends in the direction of the image depth.

At its discharge end, the branch belt 5.4 transfers the un-screened material, also referred to as oversize material, to the feed area 8.1 of the return conveyor 8. The return conveyor 8, which may be a belt conveyor, conveys the oversize material towards the feed hopper 2. At its discharge end 8.2, the return conveyor 8 transfers the oversize material into the material flow, specifically into the material feed area. The oversize material can therefore be returned to the crusher unit 10 and crushed to the desired particle size.

Figure 2:
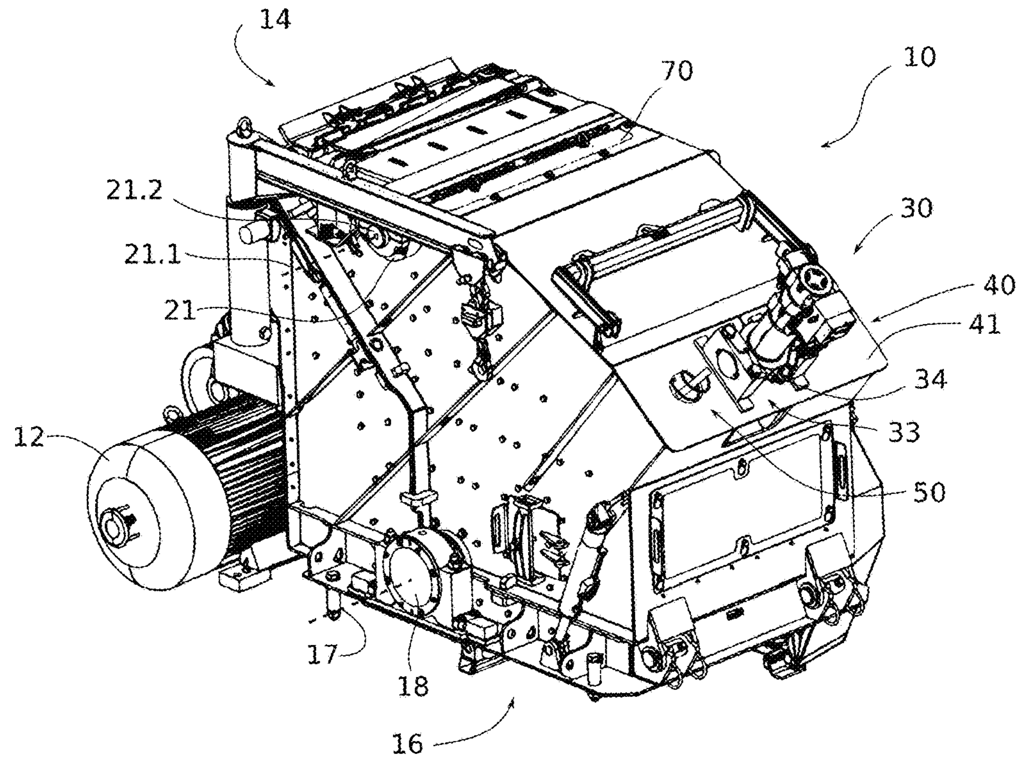
FIG. 2 shows a perspective view of a schematic representation of a crusher unit 10.

FIG. 2 shows schematic perspective view of a crusher unit 10. As can be seen from the figure, the crusher unit 10 may comprise a crusher housing 70. A crushing chamber 16.1 may be formed inside the crusher housing 70 (see FIG. 4). The crusher housing 70 may comprise a crusher inlet 14 in the form of an opening that allows material to be crushed to be routed into the crushing chamber 16.1. Further, a crusher outlet 16 may be provided in the form of a further opening of the crusher housing 70. Crushed material can leave the crushing chamber 16.1 through the crusher outlet 16.

The crusher housing 70 may be used to safely direct the flow of material from the crusher inlet 14 through the crusher unit 10 to the crusher outlet 16 by preventing material to be crushed or already crushed from leaving the crushing chamber 16.1 laterally, for instance. Furthermore, the crusher housing 70 may prevent access to the crushing chamber 16.1 at least during crushing operation. Thus, a risk of injury due to direct access to the crushing chamber 16.1 and/or ejected rock material is effectively reduced.

Figure 3:
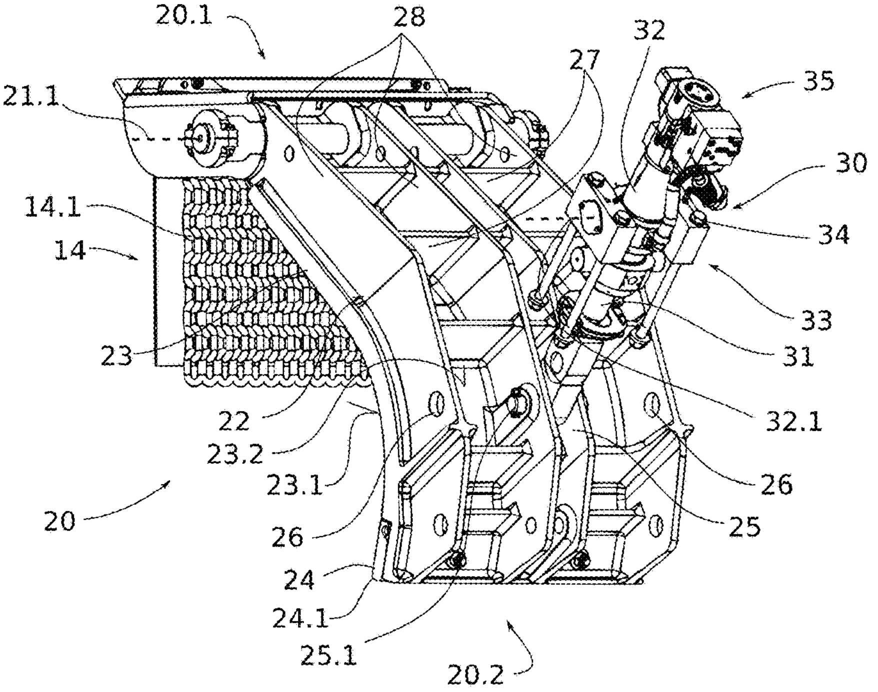
FIG. 3 shows a perspective view of a schematic representation of an impact rocker 20 having a gap-adjusting means 30.

It can be seen in FIG. 3 that a curtain 14.1 can be provided in the area of the crusher inlet 14. In particular, the curtain may consist of chains. The curtain 14.1 can protect against material being ejected from the crushing chamber 16.1 through the crusher inlet 14.

Inside the crushing chamber 16.1, an impact rotor 11 may be mounted for rotation about an axis of rotation 17. For this purpose, the impact rotor 11 may comprise a rotor shaft 11.3 (see in particular FIG. 4), which can be supported by means of rotor bearings 18. The rotor bearings 18 may be provided at and/or fastened to the crusher housing 70.

As can further be seen in FIG. 2, a drive 12 can be provided, which can drive the impact rotor 11. It may, for instance, be an electric drive. However, other drive concepts are also conceivable, for instance hydraulic drives or an internal combustion engine. The drive 12 can drive the impact rotor 11 via a gearbox, for instance a toothed gear or a belt drive. However, a direct drive is also conceivable.

The crusher unit 10 may comprise a fastening section 40, which may be used to fasten a gap-adjusting means 30 and/or a retaining device 50. This will be discussed in more detail elsewhere.

Furthermore, an impact rocker 20 may be provided inside the crushing chamber 16.1. The impact rocker 20 can be mounted to swivel about a rocker axis 21.1. For this purpose, provision may be made in particular for the impact rocker 20 to have a rocker shaft 21.2, which is supported by means of a rocker bearing 21. The rocker bearing 21 may be provided at and/or fastened to the crusher housing 70.

The impact rocker 20 can be mounted in such a way that its weight acts in the direction of a reduction of the crushing gap 15, i.e., in a swivel direction of the impact rocker 20 towards the impact rotor 11. This effect can result from the fact that the rocker axis 21.1 is disposed above and/or laterally offset from a center of mass of the impact rocker 20 in the imaging plane, as shown.

FIG. 3 shows a possible design of the impact rocker 20 and the gap-adjusting means 30 in more detail.

As can be further seen in the figure, the rocker shaft 21.2 may be provided in a bearing-end end area 20.1 of the impact rocker 20. The impact rocker 20 may comprise a rocker body 22. The rocker body 22 may comprise a base body 23. The base body 23 can preferably be designed as a curved plate, as shown in the figures. An impact surface 23.1 can be provided on the base body 23, facing the impact rotor 11 (see also FIG. 4). Material to be crushed accelerated by the impact rotor 11 can hit the impact surface 23.1.

The impact rocker 20 may further comprise least one impact plate 24. The impact plate 24 is preferably made of a resistant material and is further preferably replaceably connected to the impact rocker 20. As shown herein, the impact plate 24 may preferably be provided at least in an end area of the crushing gap end 20.2 of the impact rocker 20. An edge 24.1 of the impact plate 24 can thus delimit a crushing gap 15 at the end of the impact rocker 20 (see also FIG. 4). However, it is also conceivable that no impact plate 24 is provided, or that an impact plate 24 is not provided in the area of the edge 24.1. In this case, the edge 24.1 can also be formed by the rocker body 22, in particular by the base body 23.

As further shown in FIG. 3, the rocker body 22 may further comprise longitudinal stiffeners 28 on a rear end 23.2 facing away from the impact surface 23.1. The longitudinal stiffeners 28 may be in the form of ribbing. For instance, the longitudinal stiffeners 28 can be integrally formed with the base body 23, or can be connected thereto in a force-fitting or form-fitting manner or by material bonding. In particular, a welded joint is conceivable. The longitudinal stiffeners 28 can be used to increase the bending stiffness in the direction of a longitudinal extent of the impact rocker 20 from the end area at the bearing end 20.1 to the end area at the crushing gap end 20.2. Furthermore, transverse stiffeners 27 may be provided on the rocker body 22 in a similar manner and design.

Further, it can be seen in FIG. 3 that the crusher unit 10 may comprise a gap-adjusting means 30. The gap-adjusting means 30 may comprise an actuator 32 and a transfer element 31. The transfer element 31 may be adjustable relative to the actuator 32. The actuator 32 may also be referred to as a gap-adjusting actuator 32.

As shown herein, the gap-adjusting means 30 may be a hydraulic gap-adjusting means 30. Thus, the actuator 32 can be designed as a hydraulic cylinder. A piston can be guided inside the hydraulic cylinder. Accordingly, the transfer element 31 can be designed as a piston rod that is coupled to the piston.

At its end area facing away from the actuator 32, the transfer element 31 can preferably be swivel connected to the impact rocker 20. A coupling section 25 can be provided on the impact rocker 20 for this purpose. As shown herein, the coupling section 25 may be provided between two longitudinal stiffeners 28, for instance. In particular, provision may be made for the longitudinal stiffeners 28 to comprise facing drilled holes, through which a fastener 25.1 can be guided. The fastener 25.1 can then be passed through a matching drilled hole on the transfer element 31 to form a swivel connection.

For instance, the actuator 32 of the gap-adjusting means 30 may be secured to the crusher housing 70. In particular, it is conceivable to provide a fastener at the fastening section 40 of the crusher housing 70. As shown in the figures, fastening means 33 can be provided for this purpose, which can be designed as bearing blocks as in this case. The fastening means 33 can be braced, for instance, using screws 34 on the crusher housing 70, in particular on the fastening section 40.

The fastening means 33 can in a similar manner receive necks provided on the actuator 32. Thus, a swivelability of the actuator 32 about a swivel axis 32.1 can be achieved. The gap-adjusting means 30 can thus be swivel mounted on the impact rocker 20 on the one hand and on the crusher housing 70 on the other hand. Because the coupling section 25 of the impact rocker 20 moves along a circular path when it is swiveled, in particular when the crushing gap 15 is adjusted, such swivelability of the gap-adjusting means 30 can be particularly advantageous.

To adjust the crushing gap 15, a swiveling motion of the impact rocker 20 can be effected by adjusting the transfer element 31 relative to the actuator 32. Advantageously, the actuator 32 is designed to be double-acting, in particular a double-acting hydraulic cylinder. Thus, a reduction as well as an increase of the crushing gap 15 can be permitted by a corresponding pressurization of respective chambers of the hydraulic cylinder. Furthermore, a double-acting hydraulic cylinder can be used to ensure a constant crushing gap 15 during operation in a simple manner.

Furthermore, as can be seen in FIG. 3, the crusher unit 10 may comprise an overload device 35. As in this case, the overload device 35 may be designed to be a hydraulic overload device 35. The overload device 35 may be directly or indirectly coupled to the actuator 32. For instance, the overload device 35 may comprise a relief valve that opens in the event of an unacceptably high hydraulic pressure in one of the chambers of the hydraulic cylinder. In this way, the pressure can be relieved. Excessive pressure may result from non-crushable material, such as a particularly large and/or hard object, being in the crushing chamber 16.1. This non-crushable material can then exert a large force on the impact rocker 20. The overload device 35 can thus ensure that the impact rocker 20 can deflect away from the impact rotor 11 in such a case.

Figure 4:
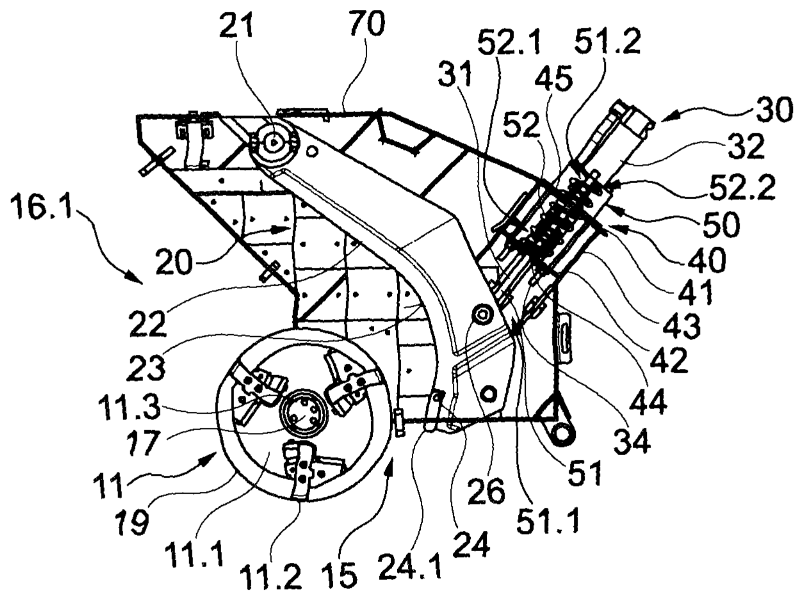
FIG. 4 shows a side view of a schematic representation of a crusher unit 10.

FIG. 4 shows the impact rotor 11 and the retaining device 50 in more detail. The retaining device 50 may also be referred to as a resilient retainer 50 configured to provide a retaining force to resiliently counteract a swiveling of the impact rocker 20 toward the impact rotor 11. As can be seen in the figure, the impact rotor 11 may comprise a base body 11.1. Impact bars 11.2 can be provided around the circumference of the base body 11.1. As shown here, the impact bars 11.2 can be detachably and thus replaceably connected to the base body 11.1. An impact circle 19 may be formed at the outermost circumference of the impact rotor 11. In this case, the impact circle 19 is formed by the orbital path of the radially outer ends of the impact bars 11.2. The impact bars 11.2 can be made of a particularly resistant, in particular wear-resistant material, or comprise such a material at least in the area of their radially outer ends. The crushing gap 15 can be formed between the impact circle 19 and an end area 20.2 of the impact rocker 20 on the crushing gap end, in particular an edge 24.1 of the impact rocker 20.

Figure 5:
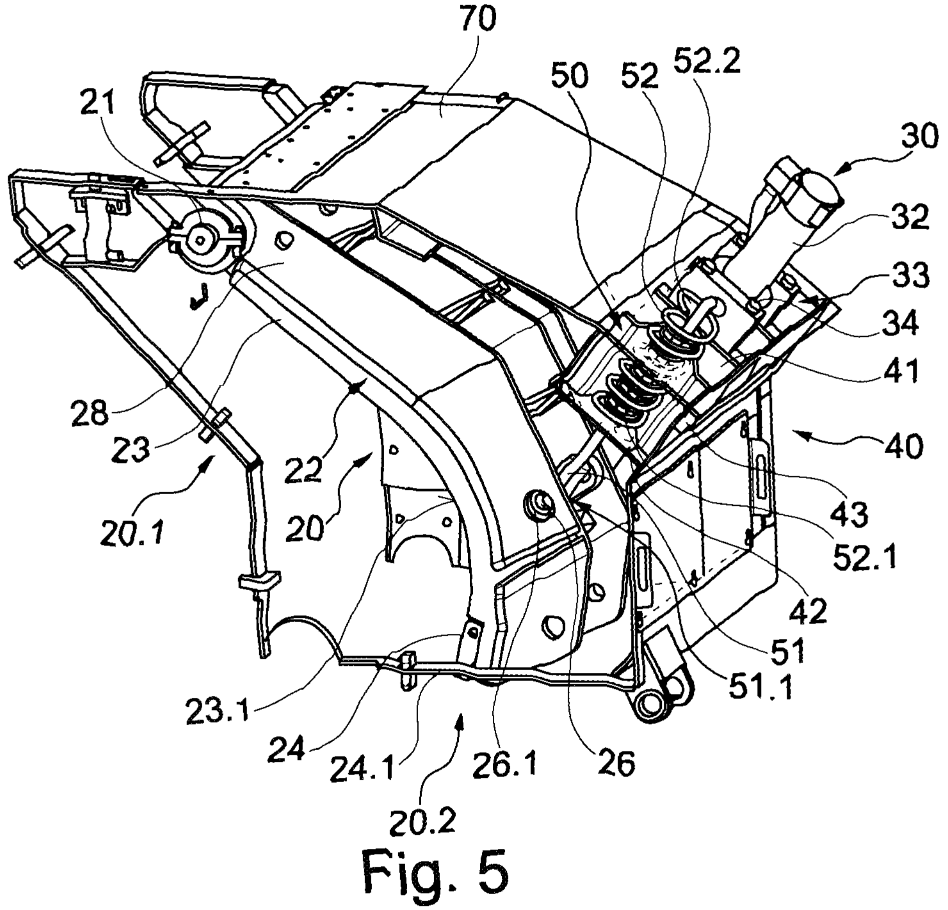
FIG. 5 shows a perspective view of a further schematic representation of a crusher unit 10.

Furthermore, FIGS. 4 and 5 show a possible embodiment of a retaining device 50. The retaining device 50 may comprise a clamping element 52 and a tension element 51. The tension element 51 can be swivel coupled to the impact rocker 20 in a coupling area at the rocker end 51.1. As shown here, a retaining section 26 can be provided on the impact rocker 20 for this purpose. Similar to the coupling section 25, the retaining section 26 may be provided between two longitudinal stiffeners 28, for instance. In particular, provision may be made for the longitudinal stiffeners 28 to comprise facing drilled holes through which a fastener 26.1 can be guided. The fastener 26.1 can then pass through a matching drilled hole on the tension element 51 to form a swivel connection.

According to this exemplary embodiment, the tension element 51 may comprise a floppy element. In this case, a rope, in particular a wire rope or a chain, is used as the tension element 51. A suitable connection means, for instance a rope clamp, can then be provided in the coupling area at the rocker end 51.1. However, it is also conceivable that a flexurally rigid element, for instance in the form of a rod, is used as the tension element 51.

Facing away from the coupling area at the rocker end 51.1, the tension element 51 may further comprise a coupling area at the clamping element end 51.2. This can be designed similarly to the coupling area 51.1 at the rocker end. The coupling area at the clamping element end 51.2 can be used to establish a force-transferring connection with the clamping element 52, for instance with a second end area 52.2 of the clamping element 52.

The force-transferring connection between the tension element 51 and the clamping element 52 is not shown in more detail in the figures. Depending on the design of the tension element 51 and the clamping element 52, different connection types can be considered. If, according to the exemplary embodiment shown, the tension element 51 is designed as a rope and the clamping element 52 as a spring, the tension element 51 can, for instance, comprise a rope clamp in its coupling area at the clamping element end 51.2. It may be detachably or non-detachably connected to the second end area 52.2. It is conceivable that a clamping element 52 designed as a spring has a spring bearing in its second end area 52.2, for instance in the form of an end plate, to which the coupling area at the clamping element end 51.2 of the tension element 51 can be secured.

In particular, if the tension element 51 is designed as a flexurally rigid element, it may be advantageous to provide a swivel connection to the clamping element 52.

The clamping element 52 may rest on the crusher housing 70. In particular, as shown in the figures, it may rest on a fastening section 40 of the crusher housing 70. For instance, the clamping element 52 can be designed as a compression spring and its spring end located in the end area 52.1 of the rocker end can rest on the fastening section 40.

Thus, the clamping element 52 can provide a compressive force resting on the crusher housing 70 in a direction away from the rocker, which can be transferred to the impact rocker arm 20 via the tension element 51. In this way, the retaining device 50 can be used to exert a retaining force on the impact rocker 20, which counteracts a swiveling motion of the impact rocker 20 towards the impact rotor 11.

However, it is also conceivable that the clamping element 52 is designed as a tension spring. In this case, the tension element 51 may be coupled to the end area of the rocker end 52.1. Accordingly, the clamping element 52 may have its second end area 52.2 coupled to the crusher housing 70, in particular to the fastening section 40. Thus, a tensile force can be introduced from the clamping element 52 via the tension element 51 into the impact rocker 20. In this case, it is also conceivable that a tension element 51 can be dispensed with, wherein the end area of the rocker end 52.1 of the clamping element 52 can be connected directly to the impact rocker 20, for instance.

Alternatively, it is also conceivable that the tension element 51 itself is designed to be flexible, in particular spring-elastic, preferably designed as a tension spring or having a tension spring. In that case, a clamping element 52 can be dispensed with, i.e., the retaining device 50 has a tension element 51 but no separate clamping element 52. The tension element 51 can then be connected to the impact rocker 20 by its coupling area at the rocker end 51.1, as described above. The tension element 51 can be connected to the crusher housing 70, in particular to the fastening section 40, via its opposite coupling area 51.2. Thus, the tension element 51 can be used to transfer a tensile force between the crusher housing 70 and the impact rocker 20.

However, a particularly advantageous embodiment of the retaining device 50 can result if, as shown in the figures, the clamping element 52 is provided as a helical compression spring. The tension element 51 can then be guided through the spring to save space. Accordingly, the tension element 51 may be mounted inside the spring at least between the end area 52.1 of the rocker end and the second end area 52.2 of the clamping element 52.

For instance, the end area 52.1 of the rocker end of the clamping element 52 may rest on a support element 41, 42 of the fastening section 40. Concentric to a longitudinal axis of the clamping element 52, the support element 41, 42 may comprise an aperture 44, 45 through which the tension element 51 may be guided.

As in this case, the fastening section 40 may comprise a hollow cross-section, in particular a rectangular hollow cross-section. For this purpose, an upper support element 41 and a lower support element 42, each in the form of a plate, for instance, may be provided. The upper support element 41 may terminate with an outer surface of the crusher housing 70. The lower support element 42 may be spaced apart from and preferably disposed in parallel to the crushing chamber 16.1. Furthermore, the support elements 41, 42 may be connected by means of connecting elements 43, for instance in the form of side walls.

The end area 52.1 of the rocker end of the clamping element 52 may rest on the lower support element 42. The lower support element 42 may comprise a first aperture 44, through which the tension element 51 may be guided. As shown herein, the upper support element 41 may comprise a second aperture 45, through which the clamping element 52 and the tension element 51 may be guided. Accordingly, the clamping element 52 and the tension element 51 may protrude at least partially from the crusher housing 70. Accordingly, the second end area 52.2 of the clamping element 52 and the coupling area at the clamping element end 51.2 of the tension element 51 may be readily accessible from outside the crusher housing 70. Thus, the connection area between the tension element 51 and the clamping element 52 can be located outside the crusher housing 70.

As can be seen in FIGS. 2 and 5, at least one gap-adjusting means 30 can be disposed in a central area of the impact rocker 20, relative to its transverse extent. The transverse extent of the impact rocker 20 can be oriented in parallel to its rocker axis 21.1 and/or in parallel to the axis of rotation 17 of the rotor shaft 11.3. Preferably, at least two retaining devices 50 can be provided. These are particularly preferably disposed along the transverse extent on both sides of the gap-adjusting means 30, and further preferably disposed symmetrically with respect thereto.

An extent oriented perpendicular to the transverse extent of the impact rocker 20 and, for instance, along the impact surface 23.1 may represent a longitudinal extent of the impact rocker 20. As shown in the figures, the gap-adjusting means 30 and the retaining device(s) 50 can preferably be disposed in an area of the half, in particular the third, of the longitudinal extent opposite from the rocker bearing 21. Thus, favorable leverage ratios can be achieved for the forces of the retaining device(s) 50 and/or the gap-adjusting means 30 relative to the swivel moment on the impact rocker 11 caused by the weight force of the impact rocker 20.

Below, the operation of the invention is explained in more detail, with reference to the illustrated exemplary embodiment.

As mentioned above, the retaining device 50 exerts a retaining force on the impact rocker 20, which counteracts a swiveling motion of the impact rocker 20 towards the impact rotor 11. Preferably, a defined minimum width of the crushing gap 15 is provided, which can be, for instance, a selected safety distance between the impact circle 19 and the impact rocker 20, in particular the edge 24.1. At the minimum width of the crushing gap 15, the retaining force of the retaining device 50 keeps the impact rocker 20 at least in equilibrium. Preferably, however, the retaining force has an excess force even in this position, such that the equilibrium position is at a greater than intended minimum distance between the impact rocker 20 and the impact rotor 11.

The gap-adjusting means 30 is used to set a desired gap width of the crushing gap 15 according to this requirements, for instance according to the material to be crushed and/or the desired end product. For this purpose, the transfer element 31 is adjusted relative to the actuator 32 such that the impact rocker 20 can be swiveled towards the impact rotor 11 to reduce the crushing gap or away from the impact rotor 11 to increase the crushing gap 15. When the crushing gap 15 is decreased, the gap-adjusting means 30 acts against the retaining force of the retaining device 50 at least along parts of the adjustment path. When the crushing gap 15 is increased, on the other hand, the retaining force of the retaining device 50 acts together with the gap-adjusting means 30 in a supporting manner at least along parts of the adjustment path. It is particularly advantageous that the retaining device 50 does not have to be adjusted in this case, because it exerts a flexible, i.e. resilient, retaining force which can be overcome by the gap-adjusting means 30. Thus, the gap-adjusting means 30 can be used to adjust the crushing gap 15 to a desired dimension during operation.

In normal operation, the gap width of the crushing gap 15 is kept largely constant by the preferably double-acting gap-adjusting means 30. The gap-adjusting means 30 can thus exert a holding force on the impact rocker 20, which can prevent any swiveling motion towards as well as away from the impact rotor 11. Situations may now arise in which the holding force of the gap-adjusting means 30 no longer applies, or at least is no longer sufficient to prevent swiveling onto the impact rotor 11.

Initially, such a situation may result from a failure of the gap-adjusting means 30. For instance, as in the case of the hydraulic gap-adjusting means 30 shown, a hydraulic system may fail depressurizing the actuator 32 (hydraulic cylinder).

Usually, however, such a situation is mostly triggered by an overload of the crusher unit 10. Such an overload can occur, for instance, if a non-crushable element is located in the crushing chamber 16.1. Such an element can exert very large forces on the impact rocker 20, pushing it in a direction away from the impact rotor 11. The transfer element 31 transfers these large forces at least partially to the gap-adjusting means 30. In such a case, an overload device 35 can prevent damage to the crusher unit 10 by allowing the impact rocker 20 to deflect.

As in this exemplary embodiment, the overload device may be a hydraulic overload device 35. The overload situation increases the pressure inside a chamber of the actuator 32, which is designed as a hydraulic cylinder. The overload device 35 may be, for instance, a relief valve that permits pressure relief of the actuator 32 at a specified overload pressure. In this way, the impact rocker 20 is permitted to deflect and, if necessary, the non-crushable element can exit the crushing chamber 16.1, which may eliminate the overload situation.

After the end of the overload situation, however, the gap-adjusting means 30 may not immediately be able to provide the required holding force again to prevent the impact rocker 20 from swiveling towards the impact rotor 11, or in the worst case, from hitting the impact rotor 11. In this case, the retaining device 50 offers an increase in operational safety, because it reliably prevents the impact rocker 20 from swiveling beyond a desired minimum distance from the impact rotor 11.

Accordingly, an undesired contact between the impact rotor 11 and the impact rocker 20 can be reliably prevented by a crusher unit 10 according to the invention, while still allowing an adjustment of the gap width of the crushing gap 15 during operation.

The invention claimed is:

1. An impact crusher, comprising:
an impact rotor;
at least one swivel-mounted impact rocker, wherein a crushing gap is formed between the impact rotor and the impact rocker;
at least one gap-adjusting actuator configured to swivel the impact rocker along an adjustment path to set a gap width of the crushing gap;
at least one resilient retainer configured to provide a retaining force to resiliently counteract a swiveling of the impact rocker toward the impact rotor; and
wherein the gap-adjusting actuator is configured to counteract the retaining force of the resilient retainer at least along a part of the adjustment path.

2. The impact crusher of claim 1, wherein:
the resilient retainer includes a spring.

3. The impact crusher of claim 2, wherein:
the resilient retainer includes a tension element connected to the impact rocker and connected to the spring such that the tension element transfers the retaining force between the spring and the impact rocker.

4. The impact crusher of claim 3, wherein:
the tension element has a first end swivel connected to the impact rocker and a second end coupled to the spring.

5. The impact crusher of claim 4, further comprising:
a crusher housing;
wherein the spring is a compression spring having a first spring end resting indirectly or directly on the crusher housing and a second spring end coupled to the second end of the tension element.

6. The impact crusher of claim 4, further comprising:
a crusher housing;
wherein the spring is a tension spring having a first spring end and a second spring end, the first spring end being closer to the impact rocker than the second spring end, the second spring end being indirectly or directly connected to the crusher housing, and the first spring end being connected to the tension element.

7. The impact crusher of claim 3, wherein:
the tension element comprises a floppy element.

8. The impact crusher of claim 2, wherein:
the gap width of the crushing gap has a minimum permissible gap width; and
the spring is configured such that the retaining force is in equilibrium with or is greater than a weight force for the impact rocker when the gap width is at the minimum permissible gap width.

9. The impact crusher of claim 1, further comprising:
a crusher housing including a fastening section;
wherein the at least one gap-adjusting actuator and the at least one resilient retainer are mounted on the fastening section of the crusher housing.

10. The impact crusher of claim 9, wherein:
the fastening section is a rectangular hollow section including a plate-shaped upper support element and a plate-shaped lower support element connected together by at least two connecting elements.

11. The impact crusher of claim 1, wherein:
the gap-adjusting actuator is centrally disposed with respect to a longitudinal extent of the impact rocker oriented parallel to an axis of rotation of the impact rocker; and
the at least one resilient retainer includes first and second resilient retainers disposed on opposite sides of the gap-adjusting actuator.

12. The impact crusher of claim 11, wherein:
the first and second resilient retainers are symmetrically disposed on opposite sides of the gap-adjusting actuator.

13. The impact crusher of claim 1, further comprising:
a crusher housing including a fastening section;
wherein the fastening section is a hollow section including a plate-shaped upper support element having a first aperture and a plate-shaped lower support element having a second aperture; and
wherein the resilient retainer includes a spring and a tension element, the tension element being connected to the impact rocker and connected to the spring such that the tension element transfers the retaining force between the spring and the impact rocker;
wherein the spring rests on the lower support element, the tension element extends through the first aperture, and the tension element and/or the spring extend through the second aperture.

14. The impact crusher of claim 1, wherein:
the gap-adjusting actuator includes a double-acting hydraulic cylinder having a position adjustable piston rod.

15. The impact crusher of claim 14, further comprising:
an overpressure valve connected to the hydraulic cylinder and configured to enable a widening of the crushing gap in case of an overload of the impact rocker.

16. The impact crusher of claim 1, further comprising:
a crusher housing;
wherein the impact rocker is swivel mounted about a swivel axis on the crusher housing by a rocker bearing;
wherein the impact rocker has a longitudinal extent oriented perpendicular to the swivel axis of the impact rocker; and
wherein the gap-adjusting actuator and the resilient retainer are connected to the impact rocker at locations within an outer half of longitudinal extent of the impact rocker away from the rocker bearing.

17. A method of adjusting a crushing gap of an impact crusher, the impact crusher including an impact rotor, a swivel-mounted impact rocker forming a crushing gap between the impact rotor and the impact rocker, a gap-adjusting actuator configured to swivel the impact rocker along an adjustment path to set a gap width of the crushing gap, and a resilient retainer configured to provide a retaining force to counteract a swiveling of the impact rocker toward the impact rotor, the method comprising:

decreasing the crushing gap to a desired gap width by applying a force with the gap-adjusting actuator against the retaining force of the resilient retainer along at least a part of the adjustment path and thereby swiveling the impact rocker along the adjustment path toward the impact rotor;

wherein when the gap width is equal to the desired gap width the gap-adjusting actuator exerts a holding force on the impact rocker maintaining the desired gap width against the retaining force.

18. The method of claim 17, further comprising:

increasing the gap width of the crushing gap to a second desired gap width by applying a force with the gap-adjusting actuator in a same direction as the retaining force along at least a part of the adjustment path and thereby swiveling the impact rocker along the adjustment path away from the impact rotor;

wherein when the gap width is equal to the second desired gap width the gap-adjusting actuator still exerts a holding force on the impact rocker maintaining the desired gap width against the retaining force.

* * * * *